US012650580B2

(12) United States Patent
Chung

(10) Patent No.: US 12,650,580 B2
(45) Date of Patent: Jun. 9, 2026

(54) OPTICAL LENS MODULE, OPTICAL ENGINE MODULE AND HEAD-MOUNTED DISPLAY DEVICE

(71) Applicant: Coretronic Corporation, Hsin-Chu (TW)

(72) Inventor: Meng-Feng Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 421 days.

(21) Appl. No.: 18/499,229

(22) Filed: Nov. 1, 2023

(65) Prior Publication Data

US 2024/0168264 A1     May 23, 2024

(30) Foreign Application Priority Data

Nov. 17, 2022    (CN) .......................... 202211439144.8

(51) Int. Cl.
*G02B 9/64* (2006.01)
*G02B 1/04* (2006.01)
*G02B 13/00* (2006.01)
*G02B 27/01* (2006.01)

(52) U.S. Cl.
CPC ......... *G02B 13/0045* (2013.01); *G02B 1/041* (2013.01); *G02B 9/64* (2013.01); *G02B 27/0172* (2013.01)

(58) Field of Classification Search
CPC ... G02B 15/1461; G02B 13/0045; G02B 9/64
See application file for complete search history.

(56) References Cited

U.S. PATENT DOCUMENTS

2018/0143411 A1*  5/2018  Minefuji .................. G02B 9/64
2022/0283412 A1   9/2022  Zhao et al.

FOREIGN PATENT DOCUMENTS

| CN | 103221869 | 7/2013 |
| CN | 108803023 | 11/2018 |
| CN | 115291389 | 11/2022 |
| TW | 1567422 | 1/2017 |
| TW | 202101064 | 1/2021 |

* cited by examiner

*Primary Examiner* — Joseph P Martinez
(74) *Attorney, Agent, or Firm* — JCIPRNET

(57) ABSTRACT

An optical lens module configured to receive at least one image light beam from an image source side, and includes a first to ninth lens elements sequentially arranged along an optical axis from an object side to the image source side. Each of the first to ninth lens elements includes an object-side surface facing the object side and an image-side surface facing the image source side. The optical lens module has an aperture at the object side. The optical lens module is a secondary imaging optical system. Refractive powers of the first to ninth lens elements are respectively positive, negative, positive, negative, positive, negative, positive, negative, and positive. The at least one image light beam is transmitted through the optical lens module and forms an intermediate image between the aperture and the image source side. An optical engine module and a head-mounted display device are also provided.

19 Claims, 6 Drawing Sheets 620.0000 NM
530.0000 NM
453.0000 NM

OPTICAL LENS MODULE, OPTICAL ENGINE MODULE AND HEAD-MOUNTED DISPLAY DEVICE

CROSS-REFERENCE TO RELATED APPLICATION

This application claims the priority benefit of Chinese application no. 202211439144.8, filed on Nov. 17, 2022. The entirety of the above-mentioned patent application is hereby incorporated by reference herein and made a part of this specification.

BACKGROUND

Technical Field

The disclosure relates to an optical module and a display device. In particular, the disclosure relates to an optical lens module, an optical engine module, and a head-mounted display device.

Description of Related Art

Near eye displays (NEDs) and head-mounted displays (HMDs) are currently products with great potential for development. The related applications of near eye display technology currently may be divided into augmented reality (AR) technology and virtual reality (VR) technology. For the AR technology, developers are currently working on how to provide the optimal image quality on the premise of light-weighting and thinning the device.

However, in an optical engine currently applied to the NED or HMD, the field of view of the optical lens does not exceed 35 degrees. In the optical design, if the field of view is to be increased, the volume of the device may inevitably be increased. If geometric efficiency and brightness are to be improved together, the aperture is required to be increased in the optical design, resulting in an increase in the volume of the device. Therefore, how to develop an optical engine with a large field of view, a small volume, and a large aperture is one of the objectives to work on in the related fields.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an optical lens module, an optical engine module, and a head-mounted display device, which have a small volume, a small effective optical diameter, a large aperture, a large field of view, and good optical effects.

Other purposes and advantages of the disclosure may be further understood from the technical features of the disclosure.

To achieve one, some, or all of the above purposes or other purposes, the disclosure provides an optical lens module configured to receive at least one image light beam from an image source side. The optical lens module includes a first lens element, a second lens element, a third lens element, a fourth lens element, a fifth lens element, a sixth lens element, a seventh lens element, an eighth lens element, and a ninth lens element sequentially arranged along an optical axis from an object side to the image source side. Each of the first lens element to the ninth lens element includes an object-side surface facing the object side and an image-side surface facing the image source side. The optical lens module has an aperture at the object side. The optical lens module is a secondary imaging optical system. Refractive powers of the first lens element to the ninth lens element are respectively positive, negative, positive, negative, positive, negative, positive, negative, and positive. The at least one image light beam is transmitted through the optical lens module and forms an intermediate image between the aperture and the image source side.

To achieve one, some, or all of the above purposes or other purposes, the disclosure further provides an optical engine module including at least one display element and an optical lens module. The at least one display element is configured to provide at least one image light beam. The optical lens module is disposed on a transmission path of the at least one image light beam. The optical lens module includes a first lens element, a second lens element, a third lens element, a fourth lens element, a fifth lens element, a sixth lens element, a seventh lens element, an eighth lens element, and a ninth lens element sequentially arranged along an optical axis from an object side to an image source side. The at least one display element is disposed at the image source side of the optical lens module. Each of the first lens element to the ninth lens element includes an object-side surface facing the object side and an image-side surface facing the image source side. The optical lens module has an aperture at the object side. The optical lens module is a secondary imaging optical system. Refractive powers of the first lens element to the ninth lens element are respectively positive, negative, positive, negative, positive, negative, positive, negative, and positive. The at least one image light beam is transmitted through the optical lens module and forms an intermediate image between the aperture and the at least one display element.

To achieve one, some, or all of the above purposes or other purposes, the disclosure further provides a head-mounted display device including a waveguide, an in-coupling element, an out-coupling element, and an optical engine module. The waveguide has a first side and a second side opposite to each other. The in-coupling element and the out-coupling element are disposed at the waveguide. The in-coupling element is located at the first side or the second side. The optical engine module is disposed at the first side of the waveguide and corresponds to the in-coupling element. The optical engine module includes at least one display element and an optical lens module. The at least one display element is configured to provide at least one image light beam. The optical lens module is disposed on a transmission path of the at least one image light beam. The optical lens module sequentially includes a first lens element, a second lens element, a third lens element, a fourth lens element, a fifth lens element, a sixth lens element, a seventh lens element, an eighth lens element, and a ninth lens element along an optical axis from an object side to an image source side. The at least one display element is disposed at the image source side of the optical lens module. Each of the first lens element to the ninth lens element includes an object-side surface facing the object side and an image-side surface facing the image source side. The optical lens module has an aperture at the object side. The optical lens module is a secondary imaging optical system. Refractive powers of the first lens element to the ninth lens element are respectively positive, negative, positive, negative, positive, negative, positive, negative, and positive. The at least one image light beam is transmitted through the optical lens module and forms an intermediate image between the aperture and the at least one display element. The optical lens module transmits the at least one image light beam to the waveguide. The at least one image light beam is transmitted in the waveguide through the in-coupling element. The at least one image light beam leaves the waveguide through the out-coupling element.

Based on the foregoing, the embodiment of the disclosure has at least one of the following advantages or effects. In the optical lens module, the optical engine module, and the head-mounted display device of the embodiment of the disclosure, the optical lens module includes the first lens element, the second lens element, the third lens element, the fourth lens element, the fifth lens element, the sixth lens element, the seventh lens element, the eighth lens element, and the ninth lens element sequentially arranged along the optical axis from the object side to the image source side. The refractive powers of the first lens element to the ninth lens element are respectively positive, negative, positive, negative, positive, negative, positive, negative, and positive. Therefore, the image light beam provided by the display element is transmitted through the optical lens module and forms the intermediate image between the aperture and the at least one display element. In this way, the volume of the optical lens module can be reduced, and a large field of view and a large aperture can also be provided.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
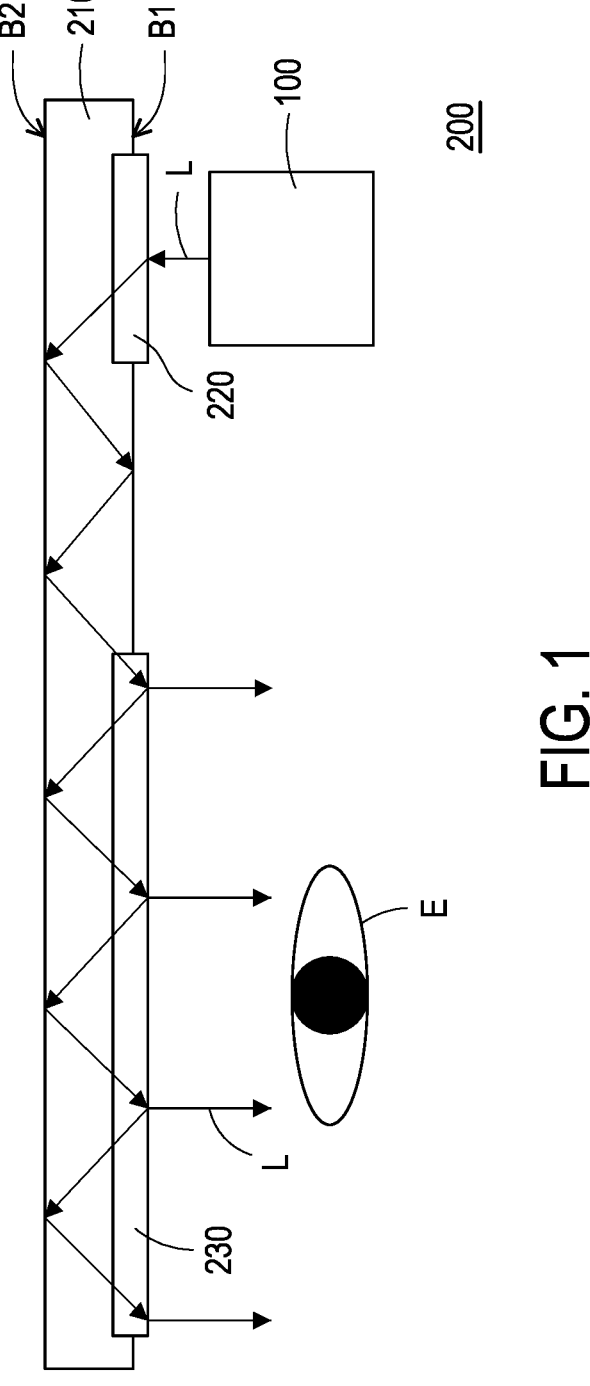
FIG. 1 is a schematic diagram of a head-mounted display device according to an embodiment of the disclosure.

FIG. 1 is a schematic diagram of a head-mounted display device according to an embodiment of the disclosure. With reference to FIG. 1, this embodiment provides a head-mounted display device 200, applying augmented reality (AR) or virtual reality (VR) display technology, and configured to provide an image frame to a human eye E, so that the human eye E sees a virtual image through the head-mounted display device 200. The head-mounted display device 200 includes a waveguide 210, an in-coupling element 220, an out-coupling element 230, and an optical engine module 100.

The waveguide 210 has a first side B1 and a second side B2 opposite to each other. The first side B1 is defined as the side adjacent to the human eye E, and the second side B2 is defined as the side away from the human eye E. The waveguide 210 is, for example, a plate substrate made of transparent materials (e.g., glass), but the type and shape thereof is not limited by the disclosure. The in-coupling element 220 is disposed at the first side B1 or the second side B2 of the waveguide 210, and the out-coupling element 230 is disposed at the first side B1 of the waveguide 210 or inside the waveguide 210. For example, in this embodiment, the in-coupling element 220 is disposed at the first side B1 of the waveguide 210, and the in-coupling element 220 and the out-coupling element 230 are located at the same side of the waveguide 210. In this embodiment, the in-coupling element 220 is, for example, a reflector, a prism, an embossed grating, a holographic grating, or the like; and the out-coupling element 230 is, for example, an array semi-transmissive semi-reflective mirror, an embossed grating, a holographic grating, or the like, and the disclosure is not limited thereto.

The optical engine module 100 is disposed at the first side B1 of the waveguide 210 and corresponds to the in-coupling element 220. The optical engine module 100 provides an image light beam L to the in-coupling element 220. The image light beam L is guided by the in-coupling element 220 into the waveguide 210 for total reflection transmission. The image light beam L transmitted inside the waveguide 210 is transmitted to the out-coupling element 230 and guided by the out-coupling element 230 to leave the waveguide 210 from the first side B1 of the waveguide 210, and is then transmitted to the human eye E. In other words, the image light beam L is transmitted from the optical engine module 100 sequentially to the in-coupling element 220 and the out-coupling element 230. It is worth mentioning that, in this embodiment, a field of view of the optical engine module 100 is greater than 65 degrees, and the optical engine module 100 is a secondary imaging optical system.

Figure 2:
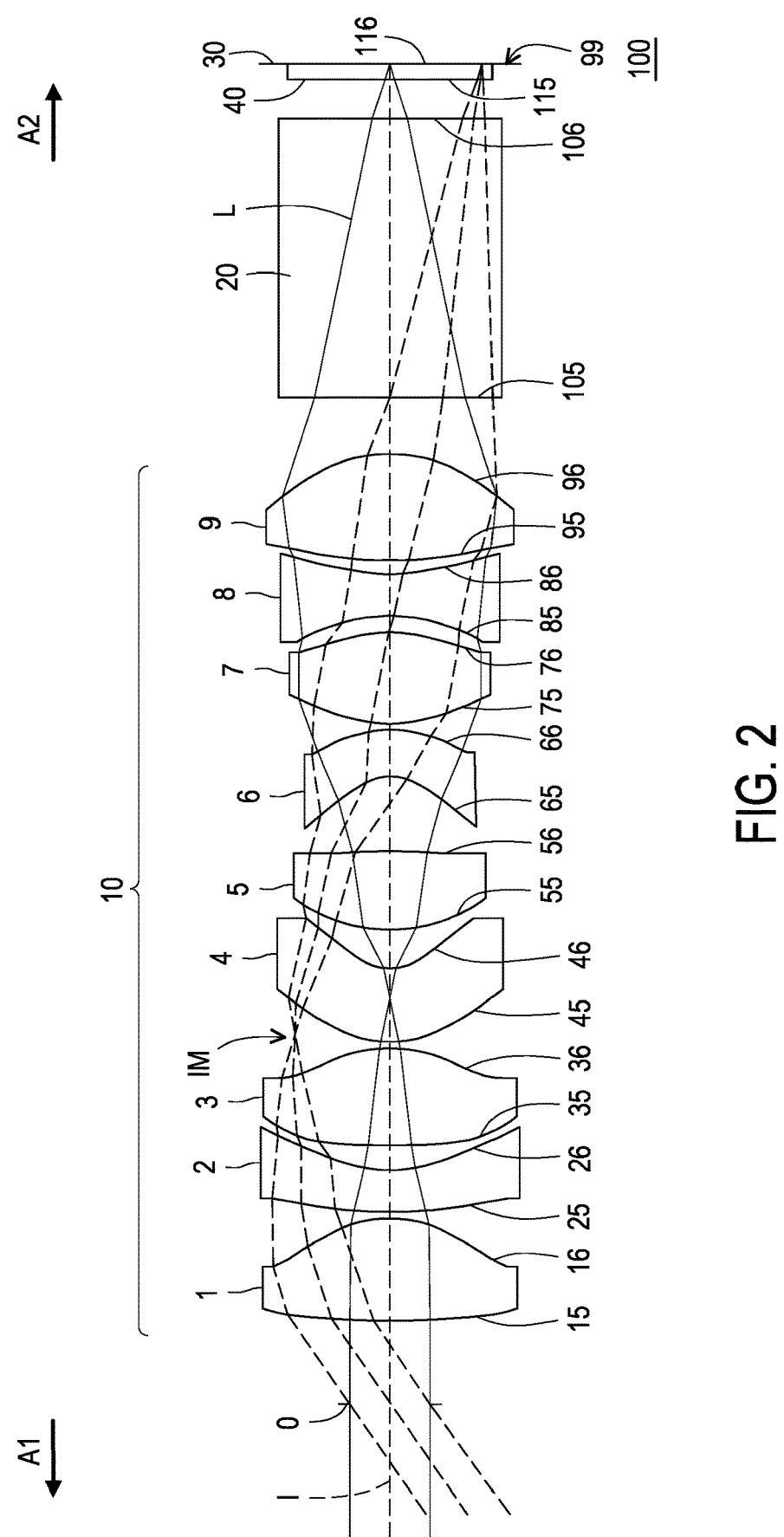
FIG. 2 is a schematic diagram of an optical engine module according to an embodiment of the disclosure.

FIG. 2 is a schematic diagram of an optical engine module according to an embodiment of the disclosure. With reference to FIG. 2, to be specific, in this embodiment, the optical engine module 100 includes at least one display element 30 (shown as a light-emitting surface 99 in FIG. 2) and an optical lens module 10. The at least one display element 30 is configured to provide at least one image light beam L including display content. For example, in this embodiment, three display elements 30 (only one is shown in FIG. 2 for convenience of illustration) may be respectively configured to provide red, blue, and green image light beams L, but the disclosure does not limited thereto. In different embodiments, one display element 30 may be configured to provide an image light beam L including red, blue, and green light beam, and optical elements (e.g., a light splitter) in the optical engine module 100 may be simplified. In this embodiment, the display element 30 may be a self-luminous display panel, for example, an organic light-emitting diode display (OLED display) panel, a micro organic light-emitting diode display (micro OLED display) panel, or a micro light-emitting diode display (micro LED display) panel. In addition, a display device that requires an additional external lighting source, for example, a transmissive liquid-crystal display (LCD) panel, a reflective-type liquid crystal on silicon panel (LCoS panel), a digital micro-mirror device (DMD), or a laser beam scanning (LBS) instrument may also be used, but the disclosure is not limited thereto.

The optical engine module 100 further includes a light-combining element 20 disposed between the optical lens module 10 and the display element 30, and the display element 30 includes a plurality of display elements. For example, in this embodiment, the display element 30 includes three display elements, and the light-combining element 20 is an X cube or an X plate configured to guide image light beams of different colors from different display elements to the optical lens module 100. In other embodiments, the light-combining element 20 may choose a light-transmitting prism (not shown) disposed between the optical lens module 10 and the display element 30 to be applied to the structure of one display element 30, and the disclosure does not limited thereto. In addition, in this embodiment, a protective cover 40 may be disposed between the light-emitting surface 99 of the display element 30 and the light-combining element 20, and configured to cover the light-emitting surface of the display element 30 to prevent dust from entering.

The optical lens module 10 is disposed on a transmission path of the image light beam L, and is configured to receive the at least one image light beam L from an image source side A2. The display element 30 is located at the image source side A2 of the optical lens module 10. The optical lens module 10 includes a first lens element 1, a second lens element 2, a third lens element 3, a fourth lens element 4, a fifth lens element 5, a sixth lens element 6, a seventh lens element 7, an eighth lens element 8, and a ninth lens element 9 sequentially arranged along an optical axis I from an object side A1 to the image source side A2. The optical lens module 10 has an aperture 0 at the object side A1. The image light beam L is transmitted through the optical lens module 10 and forms an intermediate image IM between the aperture 0 and the image source side A2. Specifically, in this embodiment, the intermediate image IM is located between the third lens element 3 and the fourth lens element 4. With reference to FIG. 1 and FIG. 2, when the image light beam L emitted by the display element 30 enters the optical lens module 10, after passing through the ninth lens element 9, the eighth lens element 8, the seventh lens element 7, the sixth lens element 6, the fifth lens element 5, the fourth lens element 4, the third lens element 3, the second lens element 2, the first lens element 1, and the aperture 0, the image light beam L is transmitted into the waveguide 210 through the in-coupling element 220, and finally forms a virtual image. In this embodiment, the aperture 0 is located on the in-coupling element 220.

In this embodiment, the first lens element 1, the second lens element 2, the third lens element 3, the fourth lens element 4, the fifth lens element 5, the sixth lens element 6, the seventh lens element 7, the eighth lens element 8, and the ninth lens element 9 of the optical lens module 10, and the light-combining element 20 and the protective cover 40 of the optical engine module 100 respectively include object-side surfaces 15, 25, 35, 45, 55, 65, 75, 85, 95, 105, 115 facing the object side A1 and passing the image light beam L and image-side surfaces 16, 26, 36, 46, 56, 66, 76, 86, 96, 106, 116 facing the image source side A2 and passing the image light beam L.

The first lens element 1 has positive refractive power. The object-side surface 15 of the first lens element 1 is a convex surface facing the object side A1, and the image-side surface 16 of the first lens element 1 is a convex surface facing the image source side A2. In this embodiment, each of the object-side surface 15 and the image-side surface 16 of the first lens element 1 is an aspheric surface, but the disclosure is not limited thereto.

The second lens element 2 has negative refractive power. The object-side surface 25 of the second lens element 2 is a convex surface facing the object side A1, and the image-side surface 26 of the second lens element 2 is a concave surface facing the image source side A2. In this embodiment, each of the object-side surface 25 and the image-side surface 26 of the second lens element 2 is an aspheric surface, but the disclosure is not limited thereto.

The third lens element 3 has positive refractive power. The object-side surface 35 of the third lens element 3 is a convex surface facing the object side A1, and the image-side surface 36 of the third lens element 3 is a convex surface facing the image source side A2. In this embodiment, each of the object-side surface 35 and the image-side surface 36 of the third lens element 3 is an aspheric surface, but the disclosure is not limited thereto.

The fourth lens element 4 has negative refractive power. The object-side surface 45 of the fourth lens element 4 is a convex surface facing the object side A1, and the image-side surface 46 of the fourth lens element 4 is a concave surface facing the image source side A2. In this embodiment, each of the object-side surface 45 and the image-side surface 46 of the fourth lens element 4 is an aspheric surface, but the disclosure is not limited thereto.

The fifth lens element 5 has positive refractive power. The object-side surface 55 of the fifth lens element 5 is a convex surface facing the object side A1, and the image-side surface 56 of the fifth lens element 5 is a convex surface facing the image source side A2. In this embodiment, each of the object-side surface 55 and the image-side surface 56 of the fifth lens element 5 is an aspheric surface, but the disclosure is not limited thereto.

The sixth lens element 6 has negative refractive power. The object-side surface 65 of the sixth lens element 6 is a concave surface facing the object side A1, and the image-side surface 66 of the sixth lens element 6 is a convex surface facing the image source side A2. In this embodiment, each of the object-side surface 65 and the image-side surface 66 of the sixth lens element 6 is an aspheric surface, but the disclosure is not limited thereto.

The seventh lens element 7 has positive refractive power. The object-side surface 75 of the seventh lens element 7 is a convex surface facing the object side A1, and the image-side surface 76 of the seventh lens element 7 is a convex surface facing the image source side A2. In this embodiment, each of the object-side surface 75 and the image-side surface 76 of the seventh lens element 7 is an aspheric surface, but the disclosure is not limited thereto.

The eighth lens element 8 has negative refractive power. The object-side surface 85 of the eighth lens element 8 is a concave surface facing the object side A1, and the image-side surface 86 of the eighth lens element 8 is a concave surface facing the image source side A2. In this embodiment, each of the object-side surface 85 and the image-side surface 86 of the eighth lens element 8 is an aspheric surface, but the disclosure is not limited thereto.

The ninth lens element 9 has positive refractive power. The object-side surface 95 of the ninth lens element 9 is a convex surface facing the object side A1, and the image-side surface 96 of the ninth lens element 9 is a convex surface facing the image source side A2. In this embodiment, each of the object-side surface 95 and the image-side surface 96 of the ninth lens element 9 is an aspheric surface, but the disclosure is not limited thereto.

In this embodiment, the optical lens module 10 include only the above nine lens elements, and each of the first lens element 1 to the ninth lens element 9 is a plastic lens element. In addition, in this embodiment, the optical engine module 100 has a total length of 25.0 millimeters (mm), the optical lens module 10 has a field of view of greater than 65 degrees, an optimal field of view of 70 degrees, an f-number (F/#) of −1.6, and an equivalent focal length of the optical lens module is a negative value. It should be noted that the f-number and the equivalent focal length are negative values due to the definition of direction. In addition, in this embodiment, the waveguide 210 in FIG. 1 is designed to increase the eye socket moving range (the range where the human eye E can still clearly see the virtual image when moving around the center of the system after the head-mounted display device 200 is worn) to 10 mm or more, for example, which can effectively reduce the thickness of the optical waveguide together with the aperture 0 of the optical lens module 10 having a diameter of 1.47 mm. Other detailed optical data are as shown in Table 1. In other embodiments, the first lens element 1 to the ninth lens element 9 may be a combination of plastic lens elements and glass lens elements. In other words, among the nine lens elements, some are plastic lens elements, and the others are glass lens elements.

TABLE 1

| Element | Surface | Radius of curvature (mm) | Thickness (mm) | Refractive power | Abbe number |
|---|---|---|---|---|---|
| Aperture 0 | | Infinity | 1.50 | | |
| First lens element 1 | Object-side surface 15 | 27.02 | 1.82 | 1.71300 | 53.87 |
| | Image-side surface 16 | −1.89 | 0.10 | | |
| Second lens element 2 | Object-side surface 25 | 9.62 | 0.75 | 1.84666 | 23.78 |
| | Image-side surface 26 | 2.34 | 0.46 | | |
| Third lens element 3 | Object-side surface 35 | 23.24 | 1.74 | 1.71291 | 53.87 |
| | Image-side surface 36 | −2.18 | 0.10 | | |
| Fourth lens element 4 | Object-side surface 45 | 1.73 | 1.30 | 1.74071 | 49.67 |
| | Image-side surface 46 | 0.71 | 0.70 | | |
| Fifth lens element 5 | Object-side surface 55 | 3.00 | 1.41 | 1.84666 | 23.78 |
| | Image-side surface 56 | −8.60 | 1.34 | | |
| Sixth lens element 6 | Object-side surface 65 | −0.75 | 0.83 | 1.52485 | 64.44 |
| | Image-side surface 66 | −1.90 | 0.10 | | |
| Seventh lens element 7 | Object-side surface 75 | 2.19 | 1.64 | 1.74325 | 49.32 |
| | Image-side surface 76 | −2.64 | 0.29 | | |
| Eighth lens element 8 | Object-side surface 85 | −2.88 | 0.75 | 1.82784 | 24.47 |
| | Image-side surface 86 | 3.09 | 0.24 | | |
| Ninth lens element 9 | Object-side surface 95 | 6.58 | 1.92 | 1.71291 | 53.87 |
| | Image-side surface 96 | −2.26 | 1.00 | | |
| Light-combining element 20 | Object-side surface 105 | Infinity | 5.00 | 1.51680 | 64.17 |
| | Image-side surface 106 | Infinity | 0.69 | | |
| Protective cover 40 | Object-side surface 115 | Infinity | 0.30 | 1.50847 | 61.19 |
| | Image-side surface 116 | Infinity | 0.01 | | |
| Display element 30 | Light-emitting surface 99 | Infinity | 0.00 | | |

Therefore, with the above configuration, the optical engine module 100 of this embodiment may form a secondary imaging optical structure, and the intermediate image IM may be formed between the aperture 0 and the display element 30. To be specific, the display element 30 provides the image light beam L sequentially transmitted through the protective cover 40, the light-combining element 20, the ninth lens element 9, the eighth lens element 8, the seventh lens element 7, the sixth lens element 6, the fifth lens element 5, the fourth lens element 4, the third lens element 3, the second lens element 2, the first lens element 1, and the aperture 0. In this way, a small volume, a small effective optical diameter, a large aperture, a large field of view, and good optical effects can be provided.

In addition, in this embodiment, each of the object-side surfaces 15, 25, 35, 45, 55, 65, 75, 85, 95 and the image-side surfaces 16, 26, 36, 46, 56, 66, 76, 86, 96 of the first lens element 1, the second lens element 2, the third lens element 3, the fourth lens element 4, the fifth lens element 5, the sixth lens element 6, the seventh lens element 7, the eighth lens element 8, and the ninth lens element 9 is an aspheric surface. The object-side surfaces 15, 25, 35, 45, 55, 65, 75, 85, 95 and the image-side surfaces 16, 26, 36, 46, 56, 66, 76, 86, 96 are general aspheric surfaces. The aspheric surfaces are defined according to Formula (1) below:

$$z = \frac{cr^2}{1 + \sqrt{1 - (1+k)c^2 r^2}} + Ar^4 + Br^6 + Cr^8 + Dr^{10} + Er^{12} + Fr^{14} \quad (1)$$

where

Z is a sag in the direction of the optical axis I;

r is the radius of curvature close to the optical axis I;

k is a conic constant;

c is the height of the aspheric surface, namely the height from the center of the lens element to the edge of the lens element; and A to F are aspheric coefficients.

The aspheric coefficients of the object-side surface 15 of the first lens element 1 to the image-side surface 96 of the ninth lens element 9 in Formula (1) are as shown in Table 2. In Table 2, field number 15 indicates an aspheric coefficient of the object-side surface 15 of the first lens element 1, and analogy may be accordingly made for other fields. In this embodiment and the following embodiments, the second-order aspheric coefficients are 0.

TABLE 2

| Surface | K | A | B |
|---|---|---|---|
| 15 | 7.72062 | 1.6473E–03 | 4.8139E–04 |
| 16 | −1.62101 | 4.7462E–03 | 2.6299E–04 |
| 25 | 5.30696 | 2.9776E–03 | −5.9594E–04 |
| 26 | −3.71242 | 2.1509E–03 | −4.2761E–04 |
| 35 | −9.25027 | 1.0917E–02 | 5.3627E–04 |
| 36 | −1.30083 | 9.0382E–03 | 2.6987E–03 |
| 45 | −0.89624 | −3.0659E–02 | 3.2865E–03 |
| 46 | −2.01043 | −1.9643E–02 | 4.3787E–03 |
| 55 | −3.53455 | 2.4661E–02 | −3.1991E–03 |
| 56 | −9.80852 | 1.6244E–02 | 5.9849E–06 |
| 65 | −2.23058 | −2.8237E–02 | 7.1570E–03 |
| 66 | −3.00241 | −1.1380E–02 | 4.9267E–03 |
| 75 | −7.33855 | 3.2260E–04 | 1.6734E–03 |
| 76 | −4.86720 | 6.3369E–04 | 1.2424E–03 |
| 85 | −2.83145 | 4.6433E–04 | −6.7774E–04 |
| 86 | −9.99895 | −2.4130E–03 | 1.3828E–04 |
| 95 | −6.61671 | 2.1917E–04 | −1.4409E–04 |
| 96 | −1.98742 | −3.4757E–03 | −2.7737E–05 |

Figure 3:
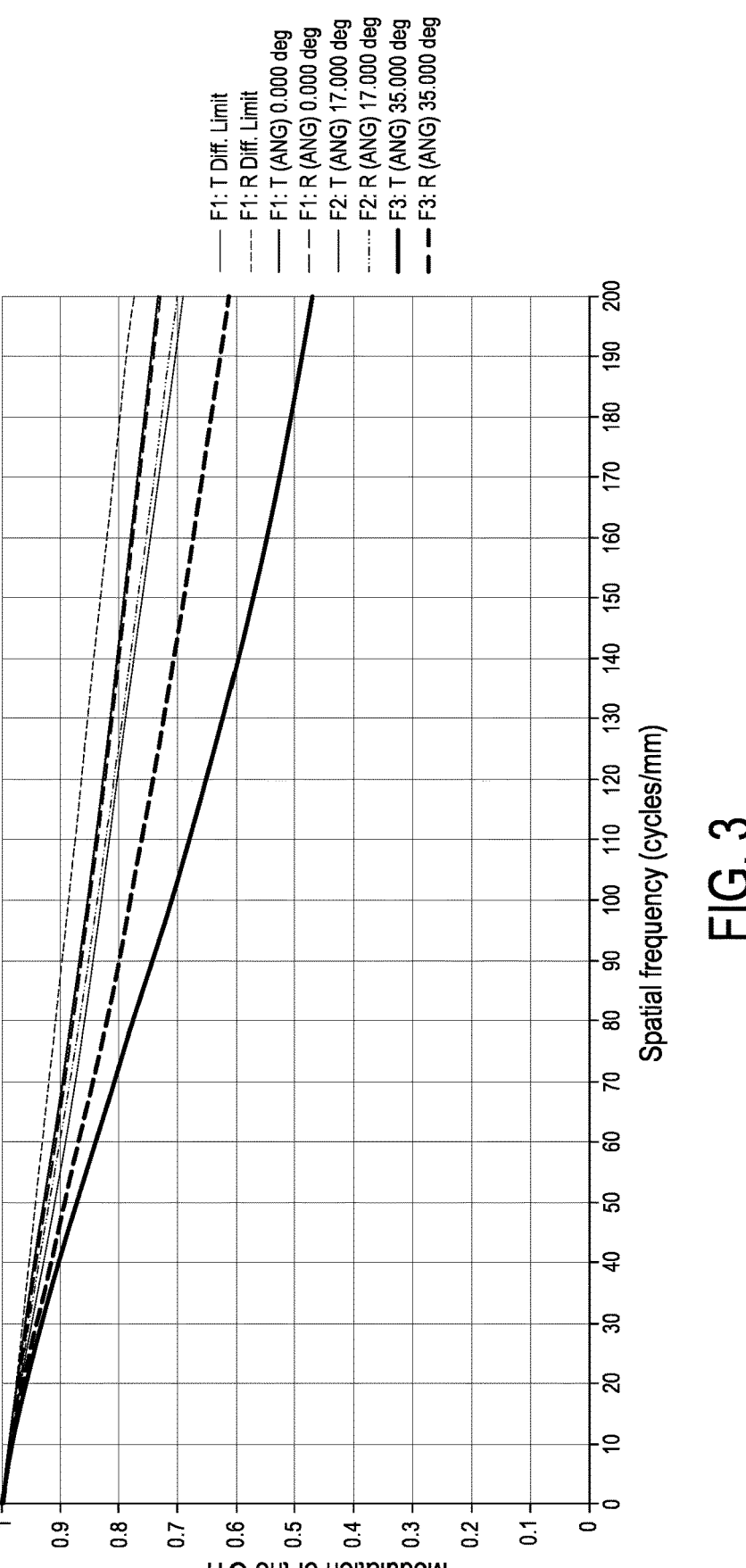
FIG. 3 and FIG. 4 are respectively modulation transfer function curve diagrams of different representations of the optical engine module in FIG. 2 on the imaging surface of the display element.
Figure 4:
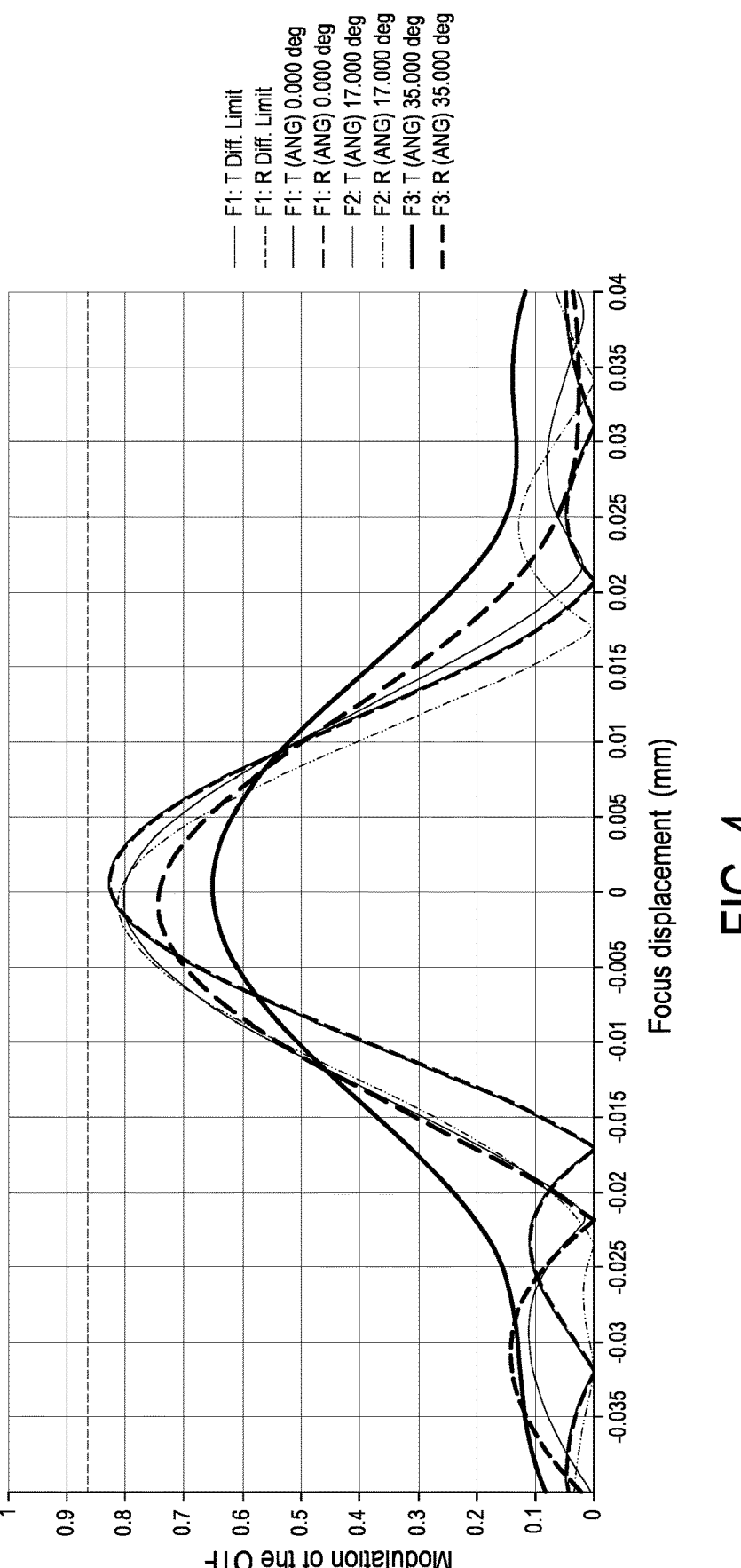
Figure 5:
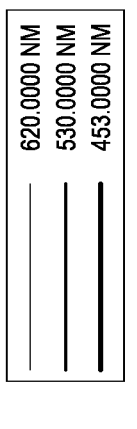
FIG. 5 shows diagrams of longitudinal spherical aberration and various aberrations of the optical engine module in FIG. 2.
Figure 5:
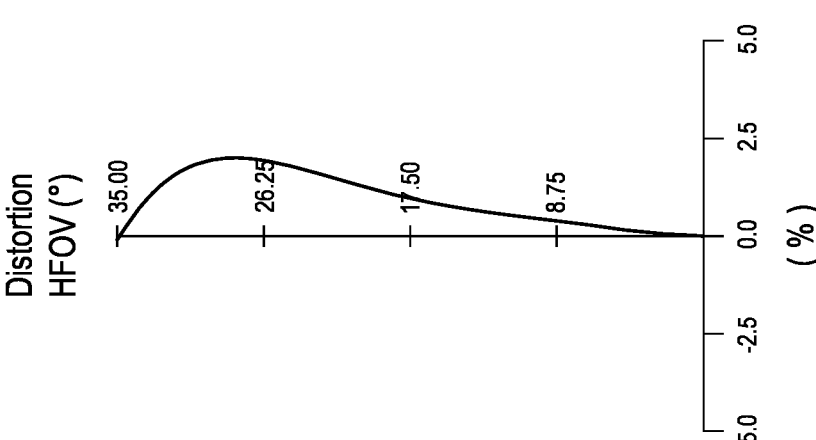
Figure 5:
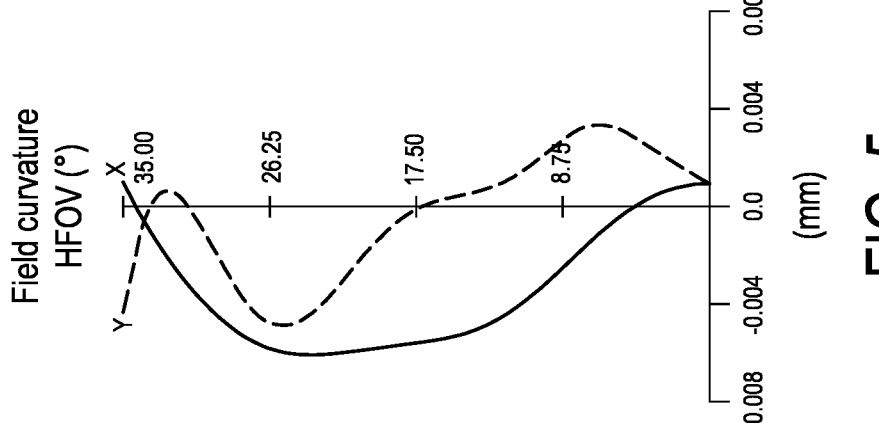
Figure 5:
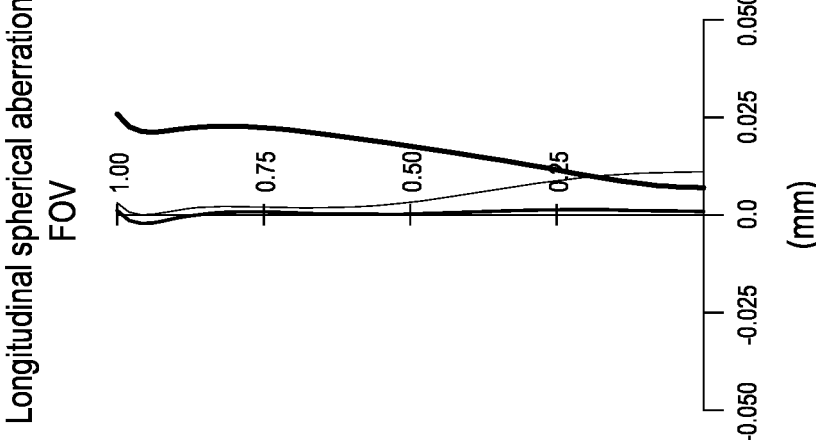
Figure 6:
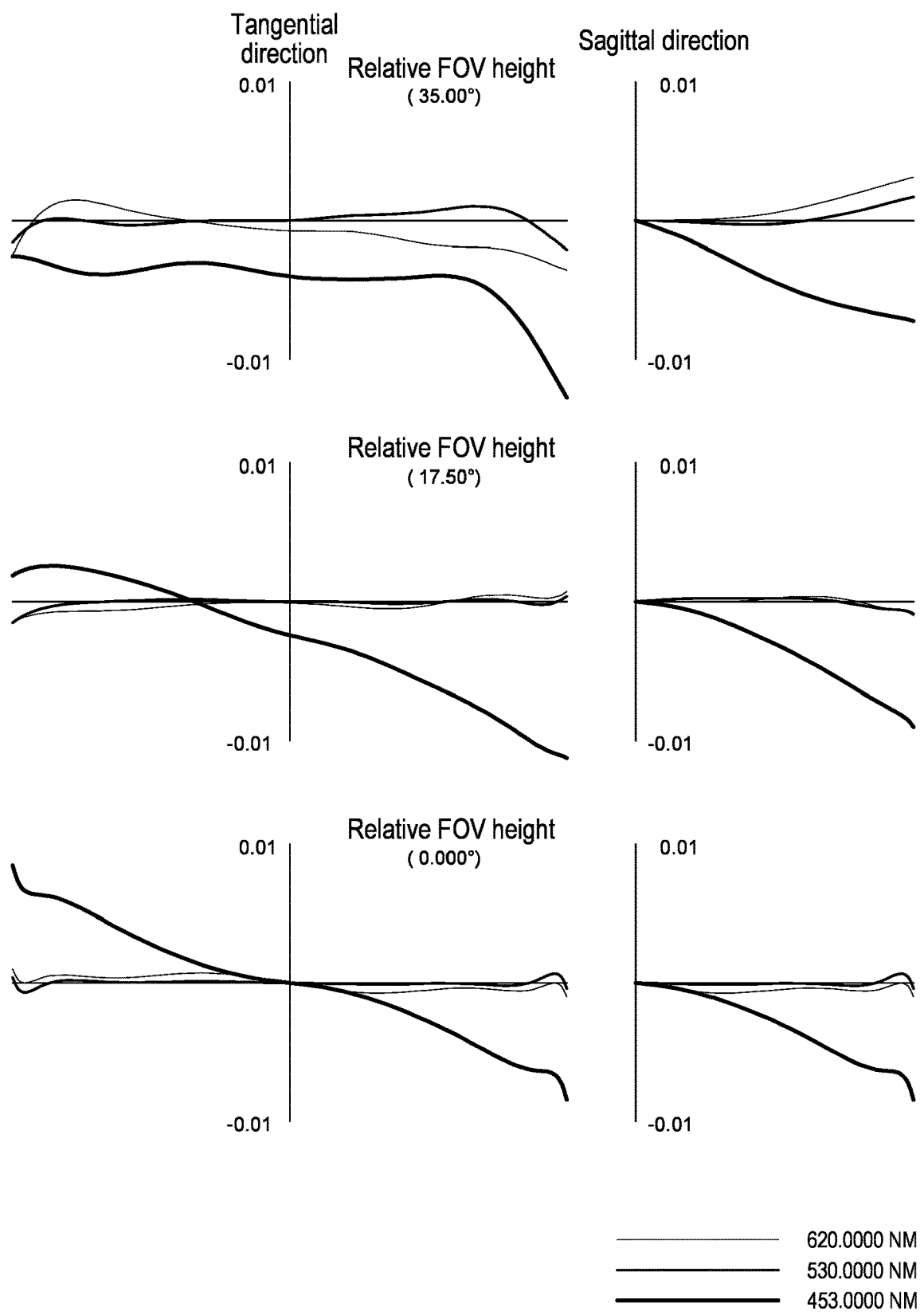
FIG. 6 shows ray fan plots of the optical engine module in FIG. 2.

Then, reference may be made to FIG. 3 to FIG. 6 together. FIG. 3 and FIG. 4 are respectively modulation transfer function (MTF) curve diagrams of different representations of the optical engine module in FIG. 2 on the imaging surface of the display element. FIG. 5 shows diagrams of longitudinal spherical aberration and various aberrations of the optical engine module in FIG. 2. FIG. 6 shows ray fan plots of the optical engine module in FIG. 2. FIG. 3 and FIG. 4 illustrate that the optical lens module 10 of this embodiment has good optical effects. FIG. 5 illustrates the longitudinal spherical aberration diagram, the astigmatic field curvature diagram, and the distortion diagram of the optical lens module 10 of this embodiment. As shown in the figure, the margin of error is small, so good optical effects are provided. FIG. 6 illustrates ray fan plots of the optical lens module 10 of this embodiment, and the displayed plots are all within the standard range, accordingly verifying that the optical lens module 10 of this embodiment can achieve good optical imaging quality.

In summary of the foregoing, in the optical lens module, the optical engine module, and the head-mounted display device of the embodiment of the disclosure, the optical lens module includes the first lens element, the second lens element, the third lens element, the fourth lens element, the fifth lens element, the sixth lens element, the seventh lens element, the eighth lens element, and the ninth lens element sequentially arranged along the optical axis from the object side to the image source side. The refractive powers of the first lens element to the ninth lens element are respectively positive, negative, positive, negative, positive, negative, positive, negative, and positive. Therefore, the image light beam provided by the display element is transmitted through the optical lens module and forms the intermediate image between the aperture and the at least one display element. In this way, the volume of the optical lens module can be reduced, and a large field of view and a large aperture can also be provided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens module configured to receive at least one image light beam from an image source side, the optical lens module comprising:

a first lens element, a second lens element, a third lens element, a fourth lens element, a fifth lens element, a sixth lens element, a seventh lens element, an eighth lens element, and a ninth lens element sequentially arranged along an optical axis from an object side to the image source side, each of the first lens element to the ninth lens element comprises an object-side surface facing the object side and an image-side surface facing the image source side, and the optical lens module has an aperture at the object side;

wherein the optical lens module is a secondary imaging optical system, refractive powers of the first lens element to the ninth lens element are respectively positive, negative, positive, negative, positive, negative, positive, negative, and positive, and the at least one image light beam is transmitted through the optical lens module and forms an intermediate image between the aperture and the image source side.

2. The optical lens module according to claim 1, wherein a field of view of the optical lens module is greater than 65 degrees.

3. The optical lens module according to claim 1, wherein an imaging position of the intermediate image is located between the third lens element and the fourth lens element.

4. The optical lens module according to claim 1, wherein at least one of the first lens element to the ninth lens element is an aspheric lens element.

5. The optical lens module according to claim 1, wherein each of the first lens element to the ninth lens element is a plastic lens element, or the first lens element to the ninth lens element are a combination of plastic lens elements and glass lens elements.

6. The optical lens module according to claim 1, wherein an equivalent focal length of the optical lens module is a negative value.

7. The optical lens module according to claim 1, wherein an f-number of the optical lens module is a negative value.

8. An optical engine module comprising:

at least one display element configured to provide at least one image light beam; and an optical lens module disposed on a transmission path of the at least one image light beam, the optical lens module comprising a first lens element, a second lens element, a third lens element, a fourth lens element, a fifth lens element, a sixth lens element, a seventh lens element, an eighth lens element, and a ninth lens element sequentially arranged along an optical axis from an object side to an image source side element, wherein the at least one display element is disposed at the image source side of the optical lens module, each of the first lens element to the ninth lens element comprises an object-side surface facing the object side and an image-side surface facing the image source side, and the optical lens module has an aperture at the object side;

wherein the optical lens module is a secondary imaging optical system, refractive powers of the first lens element to the ninth lens element are respectively positive, negative, positive, negative, positive, negative, positive, negative, and positive, and the at least one image light beam is transmitted through the optical lens module and forms an intermediate image between the aperture and the at least one display element.

9. The optical engine module according to claim 8, further comprising a light-combining element disposed between the optical lens module and the at least one display element, wherein the at least one display element comprises a plurality of display elements.

10. The optical engine module according to claim 8, further comprising a light-transmitting prism disposed between the optical lens module and the at least one display element, wherein a number of the at least one display element is one.

11. The optical engine module according to claim 8, wherein the at least one display element is a micro light-emitting diode display element, a micro organic light-emitting diode display element, an organic light-emitting diode display element, a liquid crystal display element, a liquid crystal on silicon display element, a digital micro-mirror display element, or a laser beam scanning instrument.

12. A head-mounted display device comprising:

a waveguide having a first side and a second side opposite to each other;

an in-coupling element and an out-coupling element disposed at the waveguide, the in-coupling element located at the first side or the second side; and an optical engine module disposed at the first side of the waveguide and corresponding to the in-coupling element, the optical engine module comprising:

at least one display element configured to provide at least one image light beam; and an optical lens module disposed on a transmission path of the at least one image light beam, the optical lens module sequentially comprising a first lens element, a second lens element, a third lens element, a fourth lens element, a fifth lens element, a sixth lens element, a seventh lens element, an eighth lens element, and a ninth lens element along an optical axis from an object side to an image source side, wherein the at least one display element is disposed at the image source side of the optical lens module, each of the first lens element to the ninth lens element comprises an object-side surface facing the object side and an image-side surface facing the image source side, and the optical lens module has an aperture at the object side;

wherein the optical lens module is a secondary imaging optical system, refractive powers of the first lens element to the ninth lens element are respectively positive, negative, positive, negative, positive, negative, positive, negative, and positive, the at least one image light beam is transmitted through the optical lens module and forms an intermediate image between the aperture and the at least one display element, the optical lens module transmits the at least one image light beam to the waveguide, the at least one image light beam is transmitted in the waveguide through the in-coupling element, and the at least one image light beam leaves the waveguide through the out-coupling element.

13. The head-mounted display device according to claim 12, wherein a field of view of the optical lens module is greater than 65 degrees.

14. The head-mounted display device according to claim 12, wherein the aperture of the optical lens module is located on the in-coupling element.

15. The head-mounted display device according to claim 12, wherein at least one of the first lens element to the ninth lens element is an aspheric lens element.

16. The head-mounted display device according to claim 12, wherein each of the first lens element to the ninth lens element is a plastic lens element, or the first lens element to the ninth lens element are a combination of plastic lens elements and glass lens elements.

17. The head-mounted display device according to claim 12, wherein an equivalent focal length of the optical lens module is a negative value.

18. The head-mounted display device according to claim 12, wherein an f-number of the optical lens module is a negative value.

19. The head-mounted display device according to claim 12, wherein an imaging position of the intermediate image is located between the third lens element and the fourth lens element.

* * * * *